(12) United States Patent
Cael

(10) Patent No.: US 11,319,092 B2
(45) Date of Patent: May 3, 2022

(54) SPACE VEHICLE, LAUNCHER AND STACK OF SPACE VEHICLES

(71) Applicant: AIRBUS DEFENCE AND SPACE SAS, Toulouse (FR)

(72) Inventor: Philippe Cael, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 17/270,258

(22) PCT Filed: Aug. 12, 2019

(86) PCT No.: PCT/EP2019/071540
§ 371 (c)(1),
(2) Date: Feb. 22, 2021

(87) PCT Pub. No.: WO2020/038748
PCT Pub. Date: Feb. 27, 2020

(65) Prior Publication Data
US 2021/0316885 A1    Oct. 14, 2021

(30) Foreign Application Priority Data

Aug. 23, 2018  (FR) ...................................... 1857621

(51) Int. Cl.
*B64G 1/10* (2006.01)
*B64G 1/00* (2006.01)
(Continued)

(52) U.S. Cl.
CPC ............... *B64G 1/10* (2013.01); *B64G 1/002* (2013.01); *B64G 1/503* (2013.01); *B64G 1/506* (2013.01);
(Continued)

(58) Field of Classification Search
CPC .......... B64G 1/10; B64G 1/506; B64G 1/641; B64G 1/503; B64G 1/002; B64G 1/66;
(Continued)

(56) References Cited

U.S. PATENT DOCUMENTS 5,806,800 A * 9/1998 Caplin ................... B64G 1/503
                                                  165/41
5,949,370 A   9/1999 Smith et al.
(Continued)

FOREIGN PATENT DOCUMENTS

| EP | 0260442 | 3/1988 |
| EP | 1247741 | 10/2002 |
| WO | 2010/111364 | 9/2010 |

OTHER PUBLICATIONS

French International Search Report and its English Translation for PCT/EP2019/071540, dated Sep. 20, 2019, 7 pages.
French Written Opinion of the ISA for PCT/EP2019/071540, dated Sep. 20, 2019, 6 pages.
French Search Report for FR1857621, dated May 6, 2019, 10 pages.

*Primary Examiner* — Medhat Badawi
*Assistant Examiner* — Vicente Rodriguez
(74) *Attorney, Agent, or Firm* — Nixon & Vanderhye P.C.

(57) ABSTRACT

A spacecraft is disclosed having at least three flat side walls, at least one main communication antenna, including a radiating element having a central axis of radiation (AC-AC), a movable arm configured to move between a deployed position and a folded position, a reflector suitable for reflecting or receiving radiofrequency waves in a direction of emission (DE). The radiating element is fixed to a side wall so that the central axis of radiation (AC-AC) is arranged perpendicularly to the side wall, and the movable arm is shaped so that an offset angle (β) of between 25° and 65° is formed between the side wall and the direction of emission (DE), when the movable arm is in a deployed position.

17 Claims, 13 Drawing Sheets

(51) Int. Cl.
   *B64G 1/50*   (2006.01)
   *B64G 1/64*   (2006.01)
   *B64G 1/66*   (2006.01)
   *H01Q 1/02*   (2006.01)
   *H01Q 1/28*   (2006.01)
   *H01Q 15/14*  (2006.01)

(52) U.S. Cl.
   CPC ............... *B64G 1/641* (2013.01); *B64G 1/66* (2013.01); *H01Q 1/02* (2013.01); *H01Q 1/288* (2013.01); *H01Q 15/14* (2013.01); *B64G 2001/643* (2013.01)

(58) Field of Classification Search
   CPC .... B64G 2001/643; H01Q 1/288; H01Q 1/02; H01Q 15/14; H01Q 19/13
   See application file for complete search history.

(56) References Cited

U.S. PATENT DOCUMENTS

| | | | |
|---|---|---|---|
| 6,076,773 A | 6/2000 | Salvatore | |
| 7,028,953 B2* | 4/2006 | Sebata | B64G 1/503 244/171.8 |
| 7,762,499 B1* | 7/2010 | Hentosh | B64G 1/50 244/171.8 |
| 10,053,240 B1* | 8/2018 | Helmer | H01Q 1/288 |
| 10,312,998 B2* | 6/2019 | Goodzeit | B64G 1/222 |
| 2010/0243817 A1* | 9/2010 | McKinnon | B64G 1/50 244/171.8 |
| 2014/0097981 A1 | 4/2014 | Celerier | |
| 2016/0325856 A1 | 11/2016 | Hache et al. | |
| 2017/0158357 A1* | 6/2017 | Hart, III | B64G 1/222 |
| 2017/0225802 A1* | 8/2017 | Lussier | E04H 12/003 |
| 2018/0111707 A1* | 4/2018 | Poncet | B64G 1/641 |

* cited by examiner

SPACE VEHICLE, LAUNCHER AND STACK OF SPACE VEHICLES

CROSS RELATED APPLICATIONS

This application is the U.S. national phase of International Application No. PCT/EP2019/071540 filed Aug. 12, 2019, which claims priority to French Patent Application No. 1857621 filed on Aug. 23, 2018, the entire contents of each of which are hereby incorporated by reference.

The present invention lies in the field of spacecraft, and more particularly in the field of satellites intended to be placed in orbit.

Spacecraft conventionally comprise a structure forming a support for the equipment of the spacecraft. One example of a commonly used support structure when the spacecraft is in a geostationary orbit is shown in FIG. 1. This support structure 2, of parallelepipedal shape, has a flat wall directed towards the Earth, generally called the Earth wall 4, an opposite flat wall generally called the anti-Earth wall 6, and four side walls called the North wall, South wall, East wall 8, and West wall 9. The North and South walls are not shown in FIG. 1. The North, South, East 8, and West 9 walls are parallel to an axis $A_T$ aimed at the Earth. The Earth wall 4 carries auxiliary communication antennas. Each auxiliary communication antenna comprises a source 10,11,12 mounted on a structure 13, and reflectors 14,15,16 carried by the Earth wall 4. The North and South side walls carry main radiators and solar panels. The East 8 and West 9 side walls carry an East main communication antenna 17 and a West main communication antenna 18. Only the East main communication antenna 17 is described in detail.

The East communication antenna 17 comprises a source 19 and a reflector 20 that is carried by a movable arm 21. The source 19 consists of a set of radiating elements 22. The radiating elements 22 are able to emit or receive radiofrequency waves having for their center the points of the straight line passing through the central axis of radiation $A_C$-$A_C$ of each radiating element. The radiating elements 22 are cooled by heat pipes 23 (or a thermal loop) connected to a main radiator. The heat pipes 23 each have at least two bends 24, 25 in order to be in direct thermal contact with the radiating elements 22. The reflector 20 reflects towards the Earth 26 the radiofrequency waves coming from the source 19, and receives the radiofrequency waves coming from the Earth 26. For this purpose, the movable arm 21 of the East communication antenna 17 is shaped so that the emission/reception direction $D_E$ of the reflector 20 is parallel to the plane formed by the East wall 8, and the radiating elements 22 are fixed to the East wall 8 so that their respective central axis of radiation $A_C$-$A_C$ forms an angle of approximately 45° with the east wall 8. The reflector 20 and the radiating elements 22 of the West communication antenna 18 are oriented in the same manner relative to the West wall 9.

With such an arrangement, parasitic reflection phenomena may occur. These stray reflection phenomena arise from the reflection of waves on the East 8 and West 9 walls and from the recombination of these reflected waves with the transmitted waves. These parasitic reflection phenomena can deteriorate the quality of the signals transmitted (or the signals received).

A first aim of the invention is to provide a spacecraft suitable for transmitting (and/or receiving) radiofrequency waves of better quality and which in particular are less affected by the parasitic reflection phenomena.

A second aim of the invention is to provide a spacecraft having a larger field of view and therefore able to transmit (or receive) radiofrequency waves over a larger area of the Earth.

A third aim of the invention is to provide a spacecraft that is easier to manufacture.

A fourth aim of the invention is to provide a spacecraft having a more efficient device for cooling the radiating elements.

A fifth aim of the invention is to provide a spacecraft having a device for cooling the radiating elements which is easier to attach.

To this end, an object of the invention is a spacecraft comprising:
  a support structure having two base walls arranged parallel to and at a distance from one another and at least three flat side walls attached to the base walls,
  at least one main communication antenna comprising:
    at least one radiating element carried by at least one flat side wall, said at least one radiating element having a central axis of radiation, said at least one radiating element being able to emit or receive radiofrequency waves,
    a movable arm able to move between a deployed position and a folded position,
    a reflector carried by the movable arm, said reflector being suitable for reflecting or receiving radiofrequency waves in a direction of emission, when the movable arm is in a deployed position, characterized in that said at least one radiating element is fixed to at least one side wall so that the central axis of radiation of the radiating element is arranged perpendicularly to said at least one side wall carrying said at least one radiating element, and in that the movable arm is shaped so that an offset angle of between 25° and 65° is formed between said at least one side wall carrying said at least one radiating element and the direction of emission, when the movable arm is in a deployed position.

According to some particular embodiments, the spacecraft has one or more of the following features:
  the offset angle is between 35° and 55°;
  the offset angle is equal to 45°;
  two adjacent flat side walls directly attached to each other each carry at least one radiating element having a central axis of radiation perpendicular to the side wall which carries them;
  the support structure comprises four flat side walls fixed perpendicularly to each other so as to present a square cross-section in a section plane which extends parallel to the base wall, and in which a diagonal connecting two opposite corners of said square cross-section extends along the direction of emission of the reflector, when the movable arm is in a deployed position.
  the spacecraft comprises at least one main radiator carried by a base wall and a heat transfer device comprising at least one L-shaped device for transporting heat by fluid, said device for transporting heat having a first rectilinear portion in direct thermal contact with the base wall carrying the main radiator, a single bent portion, and a second rectilinear portion in direct thermal contact with said at least one radiating element and the flat side wall carrying said at least one radiating element;
  said flat side wall carrying said at least one radiating element comprises at least one lateral cutout, and said bent portion of the device for transporting heat is engaged in said lateral cutout, the second rectilinear portion extending over an outer face of said flat side wall carrying said at least one radiating element;

the spacecraft comprises at least one electronic amplification component suitable for amplifying electrical signals transmitted to said at least one radiating element, and a housing comprising said at least one radiating element and said at least one electronic amplification component;

the spacecraft comprises at least one main radiator carried by a base wall and at least one auxiliary radiator mounted to pivot between a folded position in which the auxiliary radiator is arranged parallel to and adjacent to the main radiator, and an unfolded position in which the auxiliary radiator extends substantially as an extension of the main radiator;

said at least one auxiliary radiator has the general shape of a triangle;

one of the vertices of the triangle is truncated and defines an edge mounted to pivot relative to the main radiator;

the spacecraft comprises at least one main radiator carried by a base wall, and said at least one main radiator comprises at least three corners and at least one corner of the main radiator is truncated along a section plane parallel to the direction of emission;

the support structure (28) comprises:
four posts extending in a direction perpendicular to the base walls, said posts being distributed at the vertex of a parallelogram, and
a reinforcing structure rigidly connecting the four posts to a same center; and
the support structure has a polygonal cross-section in a section plane parallel to the plane of the base wall carrying a main radiator, said polygonal cross-section being a cross-section among a triangular cross-section, a rectangular cross-section, a square cross-section, a trapezoidal cross-section, a pentagonal cross-section, a hexagonal cross-section, or a cross-section forming any polygon.

The invention also relates to a launcher comprising a fairing and at least one spacecraft according to one of the features mentioned above, the spacecraft being arranged under the fairing, the spacecraft comprising at least one main radiator carried by a base wall, said main radiator being arranged perpendicularly to the direction of launch.

The invention also relates to a stack of multiple spacecraft in which the support structure comprises four posts extending in a direction perpendicular to the base walls, said posts being distributed at the vertex of a parallelogram, and a reinforcing structure rigidly connecting the four posts to a same center, said stack comprising at least two spacecraft arranged one on top of another, each post of a first spacecraft being carried by a post of the second spacecraft, the posts of each spacecraft extending in the same direction.

The invention will be better understood by reading the description which follows, given solely as an example and with reference to the figures in which.

Figure 1:
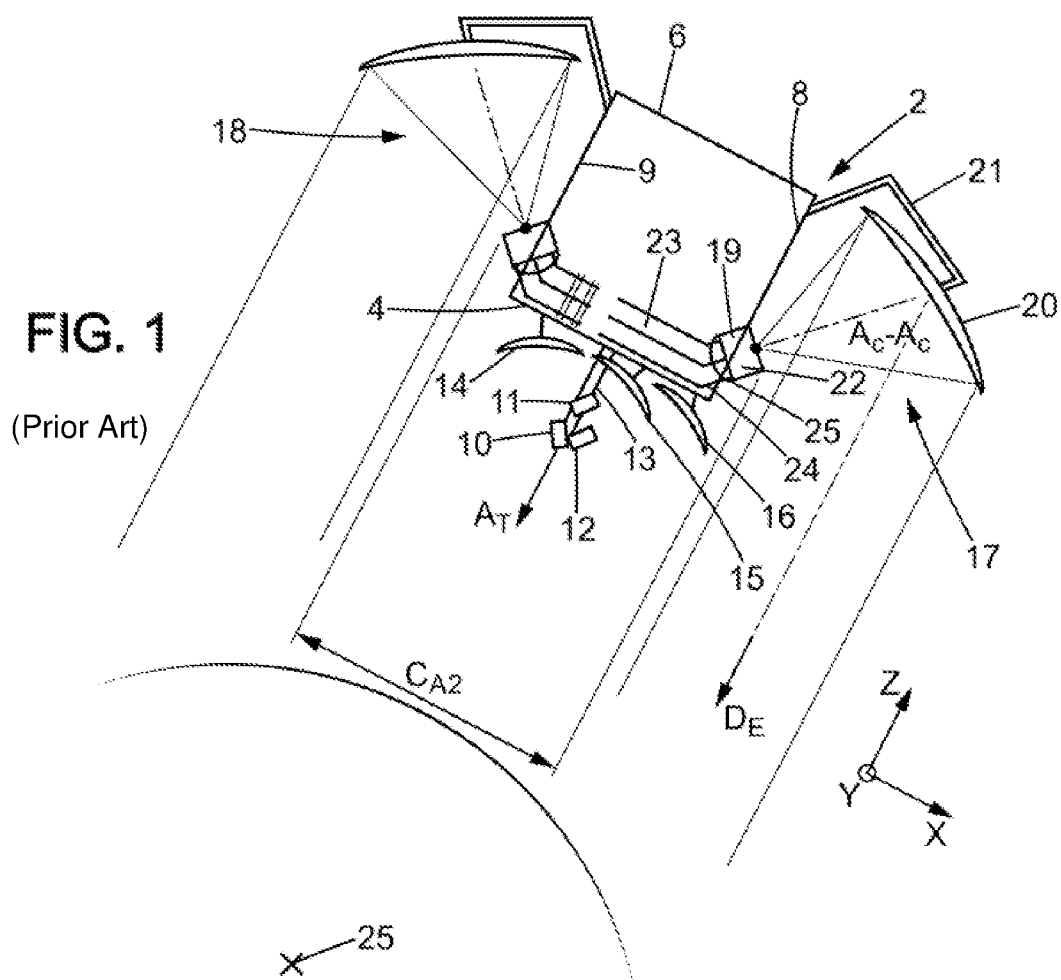
FIG. 1 is a schematic sectional view representing a spacecraft according to the prior art in geostationary orbit around the Earth, the section plane being applied in a plane parallel to the North wall.

In this patent application, the term "spacecraft" designates any system intended to operate in orbit in exoatmospheric space and capable of transporting equipment. It may be equipped with its own means of propulsion, or may be intended to be simply released at a point in space for subsequent recovery by other space assets. It may be placed in orbit in a geostationary orbit or in any other type of orbit.

In the text below, the term "in direct contact" means that there is no intermediate part or empty space between the elements.

The spacecraft 28 according to the invention comprises at least one side wall oriented at an angle α of 45° with respect to an axis aimed at the Earth 26, generally called the axis of sight $A_T$ towards the Earth.

Referring to FIGS. 2 to 5, the spacecraft 28 according to a first embodiment comprises a support structure 30 of generally square parallelepipedal shape. This support structure has first 32 and second 34 flat base walls, and four flat side walls 36, 38, 40, 42. The support structure 30 has a polygonal cross-section, and in particular a square cross-section, in a section plane parallel to the base walls 32, 34.

The first 32 and second 34 base walls are arranged parallel to and at a distance from one another. They carry main radiators 44, 46 for cooling the payload, and solar panels not shown in the figures.

The four side walls 36,38,40,42 are fixed perpendicularly to each other so that the support structure 30 has a square cross-section in a section plane (X, Z). The section plane (X, Z) is parallel to the base walls 32,34.

Two adjacent side walls 36,38 directly attached to each other are directed towards Earth 26. They are referred to as lower side walls in the remainder of the description. The other two adjacent side walls 40,42 directly attached to each other are directed away from Earth 26. They are referred to as upper side walls in the remainder of the description.

Figure 2:
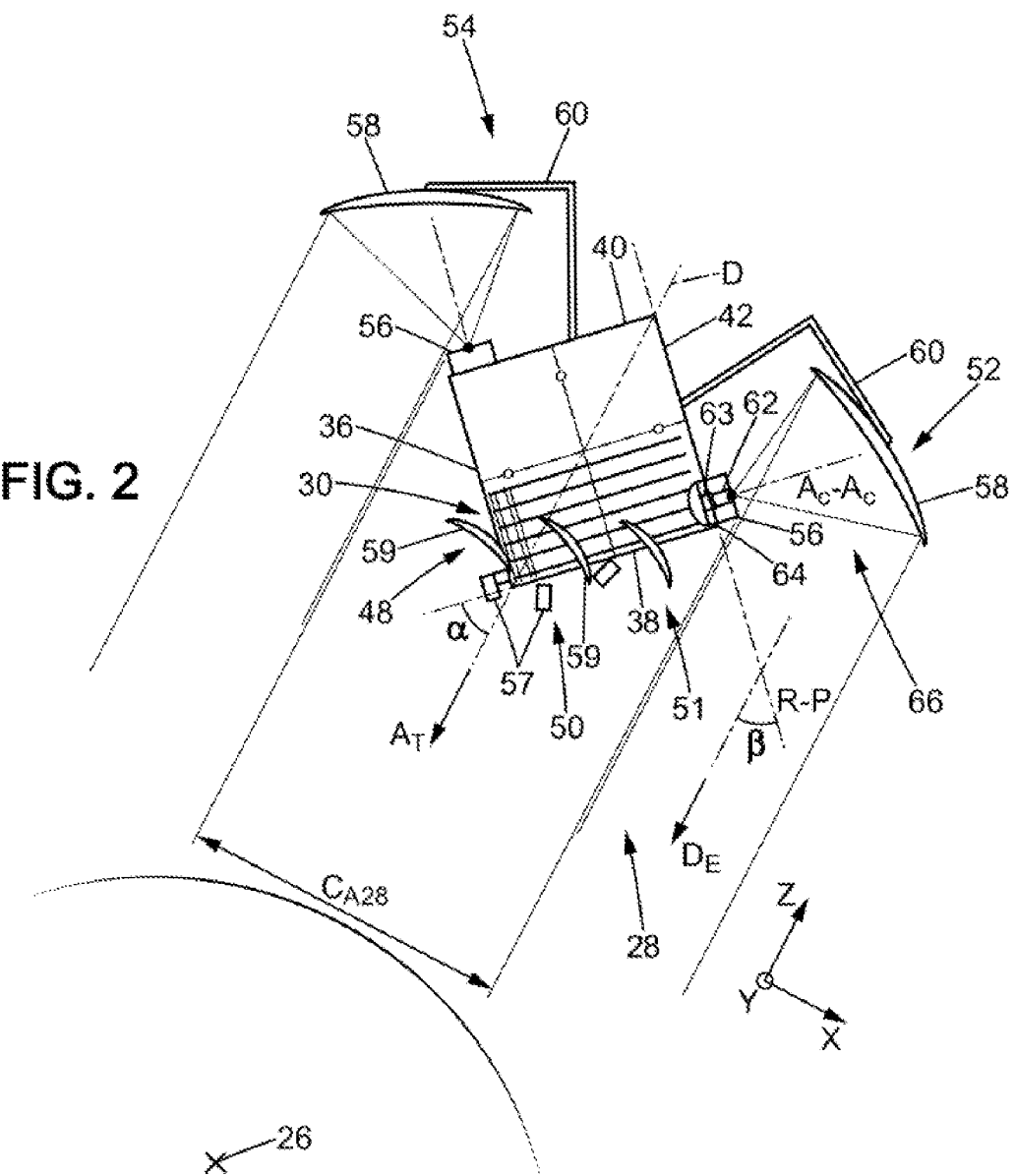
FIG. 2 is a schematic sectional view showing a spacecraft according to a first embodiment of the invention in geostationary orbit around the Earth, the section plane being parallel to the base walls.

As can be seen in FIG. 2, once in orbit, the spacecraft 28 according to this first embodiment is positioned obliquely with respect to its usual position illustrated in FIG. 1. Thus, in orbit, the four side walls 36,38,40,42 of the spacecraft according to the first embodiment are oriented at an angle α of 45° with respect to the axis $A_T$ of sight towards the Earth. In this position, a diagonal D connecting two opposite corners of the square cross-section formed by the support structure 30 is coincident with the axis $A_T$ of sight towards the Earth.

The spacecraft 28 has main communication antennas 52,54 carried by the upper side walls 40, 42, and auxiliary communication antennas 48,50,51 carried by the lower side walls 36,38.

The main communication antennas 52,54 are identical to each other. Only main communication antenna 52 will be described in detail. However, one will note that, without loss of generality, it is also possible that the invention may comprise two different antennas.

Main communication antenna 52 comprises a source housing 56, a reflector 58 capable of transmitting or receiving radiofrequency waves, and a movable arm 60 carrying the reflector 58.

The source housing 56 of main communication antenna 52 is attached to upper side wall 42. The source housing 56 of the other main communication antenna 54 is fixed to upper side wall 40 which adjoins and is directly attached to upper side wall 42.

The source housing 56 comprises radiating elements 62 suitable for generating radiofrequency waves from an electrical signal and for transmitting them to the reflector 58.

Advantageously, the source housing 56 is of the active type, meaning that it comprises amplification components 63 adapted to amplify the electrical signal before its transmission to the radiating elements.

Note that to simplify the figures, a single radiating element 62 and a single electronic amplification component 63 have been schematically represented in FIG. 2.

The radiating elements 62 are, for example, helices, cones, patches, or dipoles. They have a central axis Ac-Ac of radiation directed towards the reflector 58. The radiating elements 62 are fixed to the upper side wall 42 so that their respective central axis Ac-Ac of radiation is arranged perpendicularly to the plane P-P formed by the side wall 42 carrying them.

Preferably, the source housing 56 is attached adjoining the peripheral edge 64 of the upper side wall 42, said upper side wall 42 being assembled to the edge of the lower side wall 38.

Figure 5:
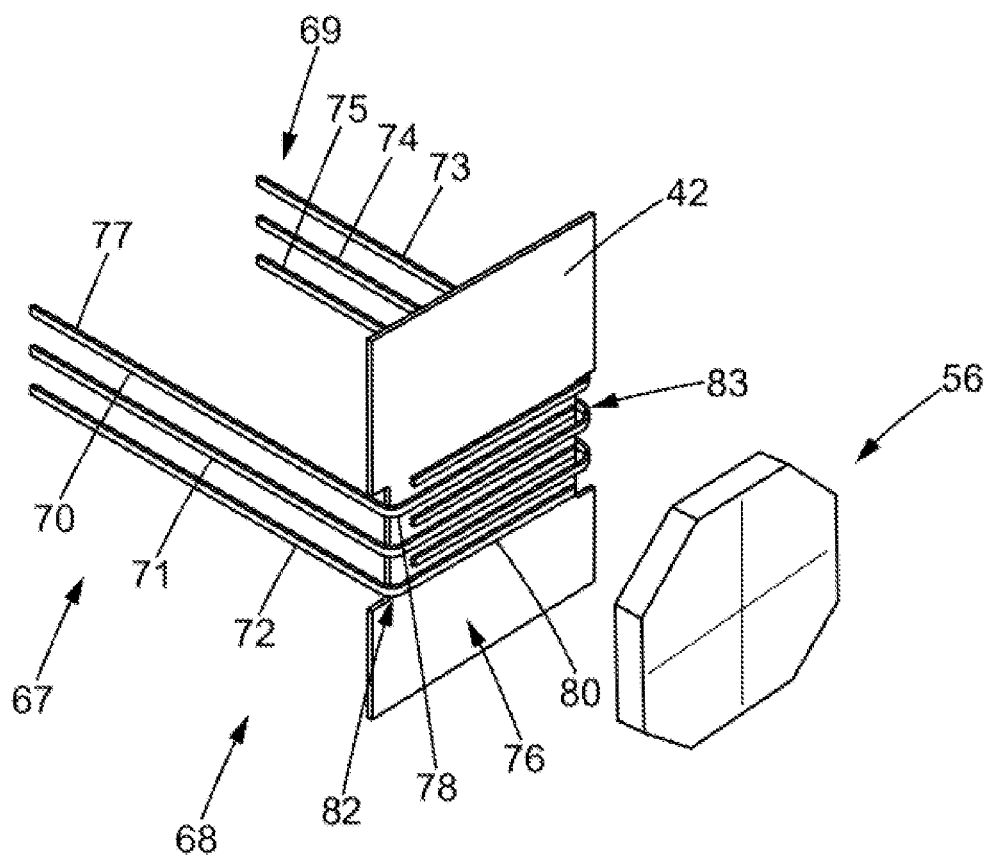
FIG. 5 is a perspective view of part of a thermal device, of a side wall, and of a source housing.

The movable arm 60 is mounted on the upper side wall 42. It is able to move between a position called the folded position, in which the reflector 58 is folded against the support structure 30 as illustrated in FIG. 5, and a position called the deployed position, in which the movable arm is deployed to the maximum possible extent of its travel as illustrated in FIG. 2.

When the reflector 58 is in a deployed position, it is able to transmit or receive a field 66 of radiofrequency waves in a direction of emission $D_E$. The direction of emission $D_E$ is parallel to the axis of sight towards the Earth $A_V$.

The movable arm 60 of the main communication antennas 52,54 is shaped so that an offset angle β is equal to 45° when it is in a deployed position, it being understood that the term "offset angle β" in the present description denotes the angle defined between the plane P-P formed by the upper side wall 42 and the direction of emission $D_E$ of the radiofrequency waves transmitted by the reflector 58, when the movable arm 60 is in a deployed position.

Advantageously, this configuration of the movable branch 60, associated with the positioning of the radiating elements 62 with their respective central axes of radiation $A_C$-$A_C$ perpendicular to the upper side wall 42, makes it possible to limit the parasitic reflection phenomena. Indeed, in this configuration, a portion of the upper side walls 40, 42 and a portion of the lower side walls 36, 38 are further from the field 66 of radiofrequency waves emitted or received by the reflector 60.

The auxiliary communication antennas 48,50,51 are similar to the main communication antennas 52,54 except for the fact that their reflectors 59 have a diameter smaller than the diameter of the reflectors 58 of the main communication antennas and the fact that their source housings 57 and their movable arm 61 are fixed to the lower side walls 36,38.

The positioning of the radiating elements 62 of the main antennas, the configuration of the movable arm 60 of the main antennas, and the resulting oblique orientation of the spacecraft 28, allow the auxiliary antennas to have a larger surface area $C_{A28}$ available for transmitting data. This surface area available for transmission is called field of view $C_{A28}$ in the present patent application. Indeed, by comparing FIGS. 1 and 2, it can be seen that in the spacecraft 28 according to the first embodiment of the invention, the field of view $C_{A28}$ is greater than the field of view $C_{A2}$ of the auxiliary communication antennas 10,14; 11,15; 12,16 of the spacecraft according to the state of the art. As a result, the spacecraft according to this first embodiment of the invention allows data to be transmitted over a larger area of the Earth 26.

In addition, advantageously, in the spacecraft 28 according to the invention, the source housings 57 and/or the reflectors 59 of the auxiliary communication antennas are attached close to the support structure 30 while in the spacecraft according to the prior art visible in FIG. 1, the source housings 10,11,12 of the auxiliary communication antennas are mounted on a structure 13 projecting from the support structure. This results in a mass penalty and an additional manufacturing cost penalty for the spacecraft in comparison to the invention.

Figure 4:
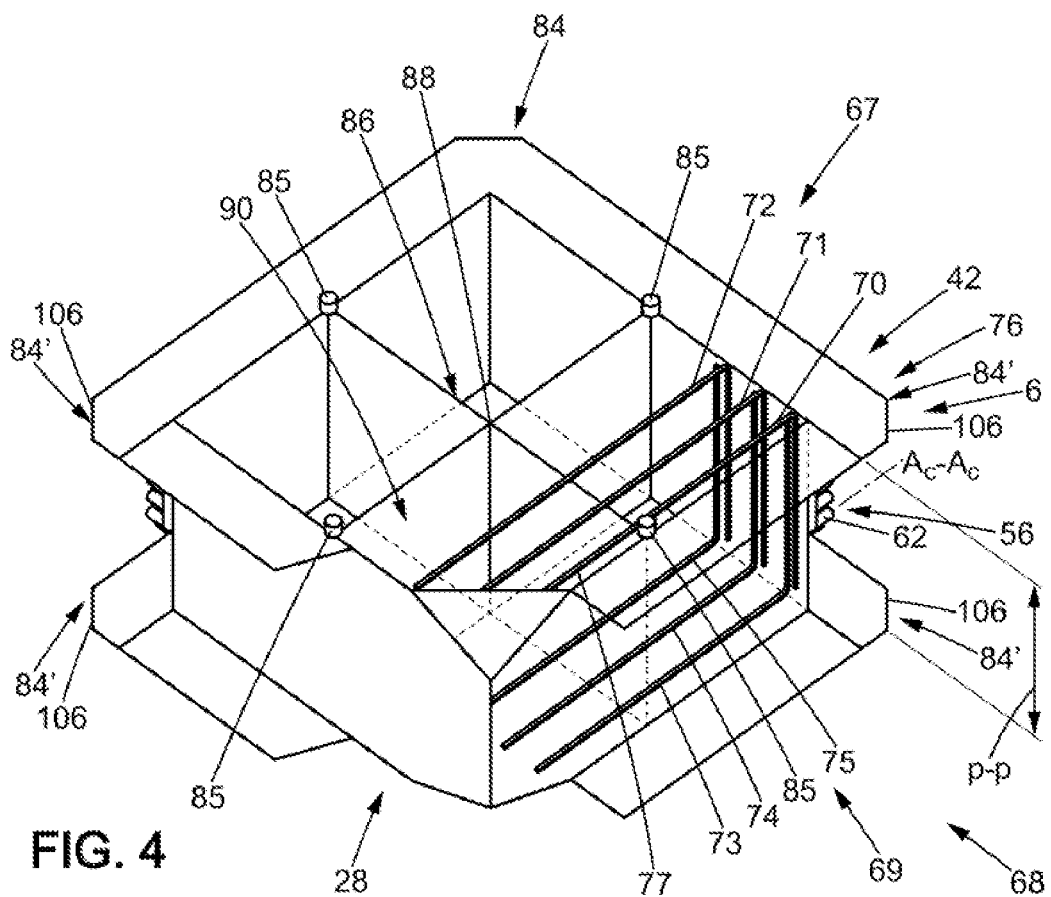
FIG. 4 is a partial cutaway perspective view of the spacecraft shown in FIG. 3.

Referring to FIGS. 4 and 5, the spacecraft 28 according to the first embodiment of the invention further comprises a heat transfer device 68 comprising devices for transporting heat by fluid that are suitable for transmitting the heat dissipated by the payload to the main radiators 44, 46, and devices for transporting heat by fluid that are suitable for transmitting the heat dissipated by the radiating elements 62 and the electronic amplification components 63 to the main radiators 44, 46.

In the example of a spacecraft according to the first embodiment illustrated in FIG. 4, represented are first 67 and second 69 sets of three devices for transport 70 to 72 and 73 to 75 suitable for cooling the source housing 56 attached on the upper side wall 42. In this figure, the devices for transport intended to cool the source housing 56 fixed on the other upper side wall 40 have not been represented in order to simplify the drawings. The first set 67 of devices for transport is in direct thermal contact with the first base wall 32, and the second set 69 of devices for transport is in direct thermal contact with the second base wall 34.

The cooling of the radiating elements 62 and of the electronic components 63 by main radiators 44, 46 having opposite orientations makes it possible both to provide a cooling redundancy function and to obtain maximum cooling regardless of the position of the sun in relation to the spacecraft, by coupling the North and South faces.

Only device 70 for transport will be described in detail.

Device 70 for transport is, for example, composed of a heat pipe.

Device 70 for transport is L-shaped having an arm extending on the inner face of the first base wall 32 and an arm extending on the outer face 76 of the upper side wall 42.

In particular, with reference to FIG. 5, device 70 for transport is provided with a first rectilinear portion 77, a single bent portion 78, and a second rectilinear portion 80.

The first rectilinear portion 77 is in direct thermal contact with the first base wall 32 carrying the main radiator 44. The bent portion 78 is engaged in a first lateral cutout 82 formed in the upper side wall 42. The second rectilinear portion 80 is in direct thermal contact, on one side, with the radiating elements 62 and the electronic amplification components 63 of the source housing 56, and on the other side with the outer face 76 of the upper side wall 42 carrying the radiating elements.

Similarly, the bent portions 78 of devices for transport 73 to 75 of the second set 69 are engaged in a lateral cutout 83 arranged on the opposite edge of the upper side wall 42. Devices for transport 73 to 75 of the second set 69 are advantageously positioned to alternate between the devices for transport 70 to 73 of the first set 67.

Since the devices for transport 70 to 75 are in direct contact with the radiating elements 62 and amplifying electronic components 63, they are very efficient and allow a large amount of dissipated power to be efficiently removed. This arrangement allows the main communication antennas 52,54 to transmit radiofrequency waves in high frequency bands, for example such as in the Ka, Q, V, or W band. Indeed, in general, the distance between the radiating elements 62 is determined as a function of the length of the radiofrequency waves emitted by the radiating elements. When the radiating elements 62 are to emit radiofrequency waves in high frequency bands, the radiating elements 62 must be placed close to each other. However, this proximity between the radiating elements 62 increases the power density dissipated by the amplifiers that emit the radiofrequency waves. Advantageously, the devices for transport 70 to 75, of the spacecraft according to the first embodiment of the invention, make it possible to efficiently transport a large amount of heat to the two main radiators 44,46.

Advantageously, the devices for transport 70 to 75 all have the same L-shape so that their manufacture can be standardized. This results in a reduction in their manufacturing costs.

Also advantageously, the shape of the devices for transport 70 to 75 is simple. It comprises a single elbow so that the circulation of fluid inside them is facilitated. This results in more efficient heat transport.

Figure 3:
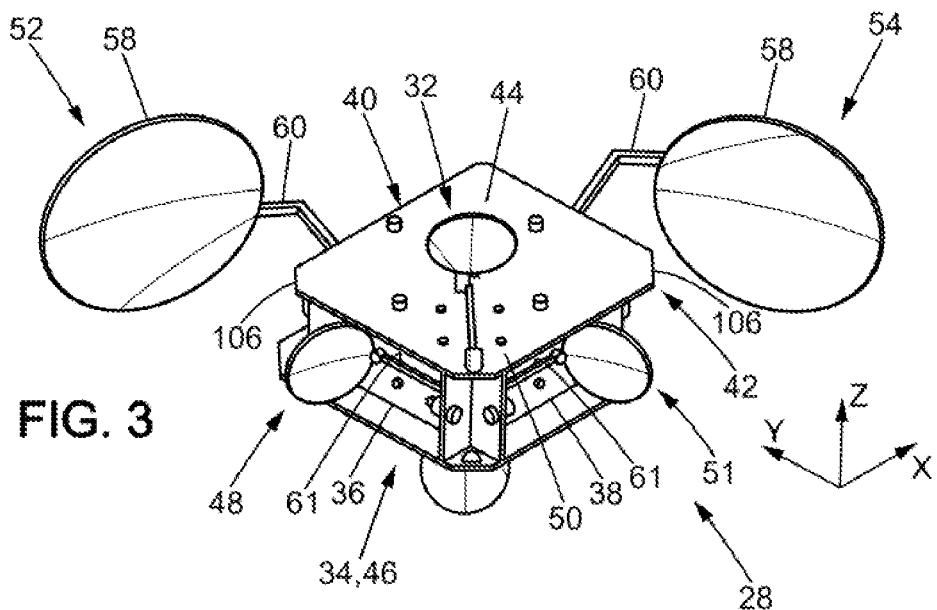
FIG. 3 is a perspective view of a spacecraft according to a first embodiment of the invention.

Referring to FIGS. 3 and 4, the main radiators 44,46 of the spacecraft according to the first embodiment have the general shape of a flat parallelepiped having four truncated corners 84. In particular, the shape of the main face of these main radiators 44,46 is a square having two truncated corners 84,84' defining side edges 106. The at least two truncated corners 84' are the corners located in the field 66 of radiofrequency waves. The bisector of these corners 84' is substantially perpendicular to the direction of emission $D_E$. The cutting plane of the corners 84' and the resulting side edge 106 are parallel to the direction of emission $D_E$.

Advantageously, the presence of truncated corners 84' makes it possible to mount radiators on the spacecraft 28 according to the first embodiment that are of a size greater than the size of the square cross-section of the support structure 30, and therefore to increase the heat rejection capacity of the spacecraft 28 while having reflectors 58 of large diameter for transmitting radiofrequency waves over a large area of the Earth 26.

Referring to FIG. 4, the spacecraft 28 comprises four posts 85 extending in a direction perpendicular to the base walls 32, 34, and a reinforcing structure 86 rigidly connecting the four posts to a same center 88.

The four posts 85 are distributed at the vertex of a parallelogram and in particular of a square. The posts 85 are positioned in the middle of the side walls 36,38,40,42 and are each fixed against a side wall. The reinforcing structure 86 comprises four struts 90. Each strut 90 extends between a post 85 and the center 88.

Advantageously, the posts 85 and the reinforcing structure 86 allow stiffening and reinforcing the mechanical strength of the spacecraft in a direction perpendicular to the base walls 32, 34.

Figure 6:
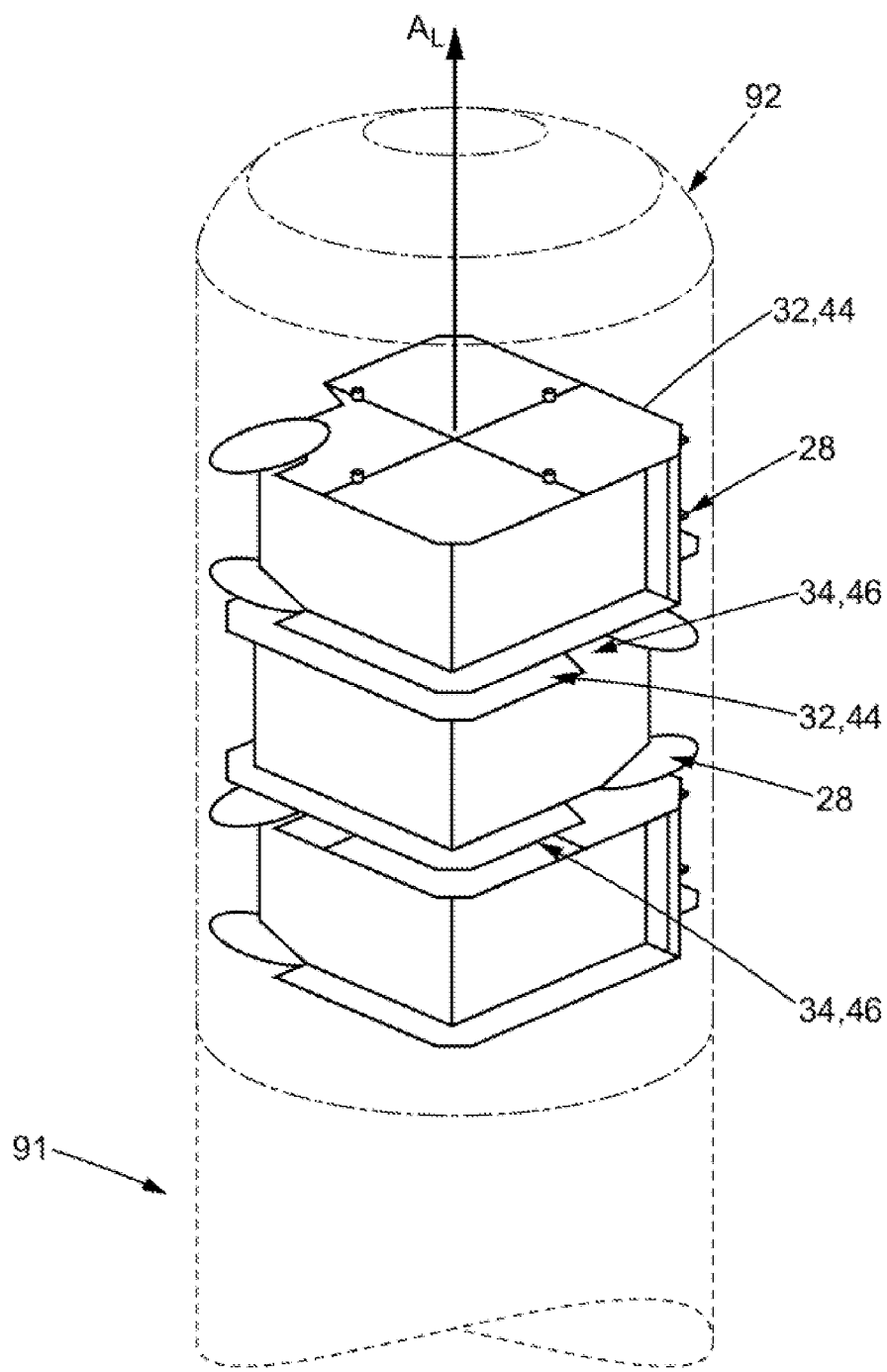
FIG. 6 is a perspective view of a stack of two spacecraft according to the invention and of a fairing shown in transparency.

Thus, with reference to FIG. 6, multiple spacecraft 28 according to the first embodiment of the invention are stacked in the fairing 92 of a launcher 91, with their main radiators 44, 46 arranged perpendicularly to the direction of launch $A_L$ of the launcher.

Figure 7:
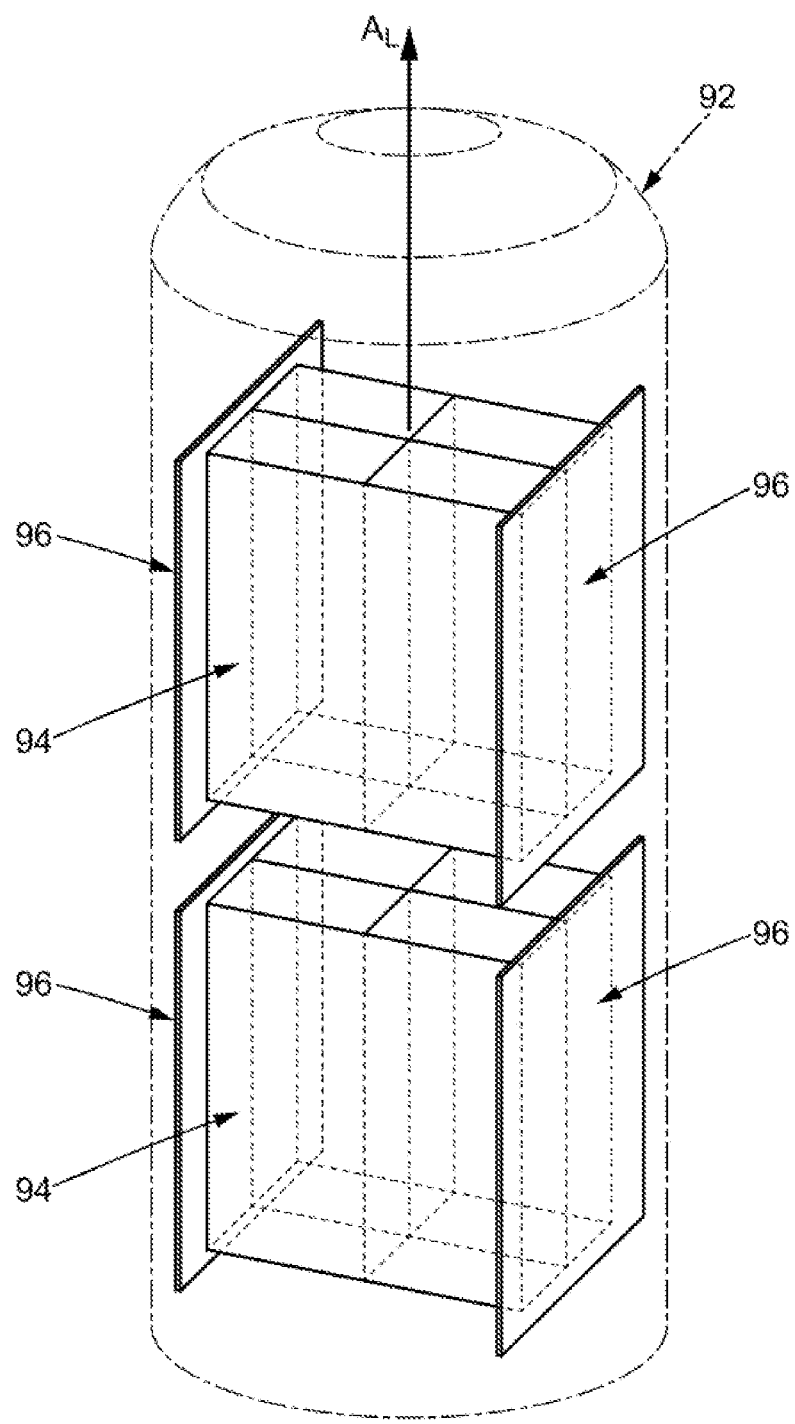
FIG. 7 is a perspective view of a stack of two spacecraft according to the prior art and of a fairing shown in transparency.

Advantageously, this new orientation of multiple spacecraft inside the fairing 92 makes it possible to stack a larger number of spacecraft along the launch direction $A_L$ of the launcher, as can be seen by comparing the stack of multiple spacecraft 94 according to the prior art illustrated in FIG. 7 and the stack of multiple spacecraft 28 according to the first embodiment of the invention illustrated in FIG. 6. In FIG. 7, the multiple spacecraft 94 are stacked so that their main radiators 96 are in a plane parallel to the direction of launch $A_L$.

Figure 8:
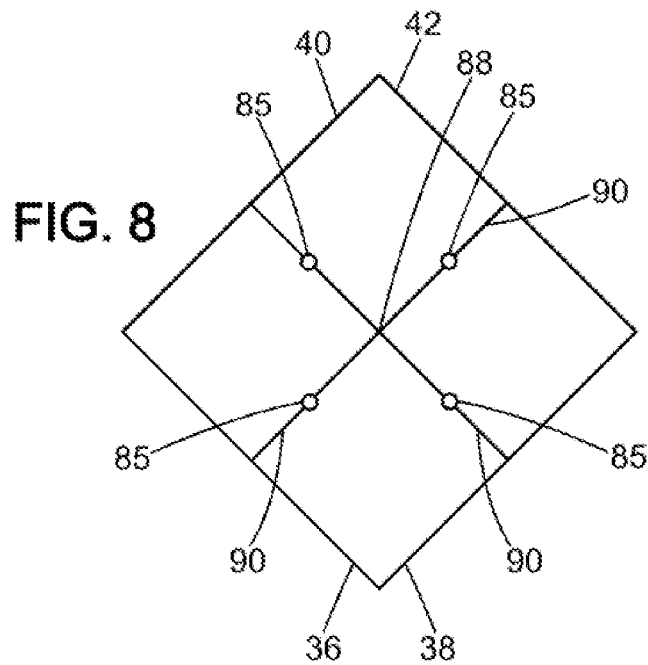
FIG. 8 is a sectional view of a first variant of the reinforcing structure of the spacecraft according to the first embodiment of the invention, the section plane being parallel to the base walls.

Alternatively, the posts 85 are fixed midway between the center 88 and the side walls 36, 38, 40, 42, as shown in FIG. 8.

Figure 9:
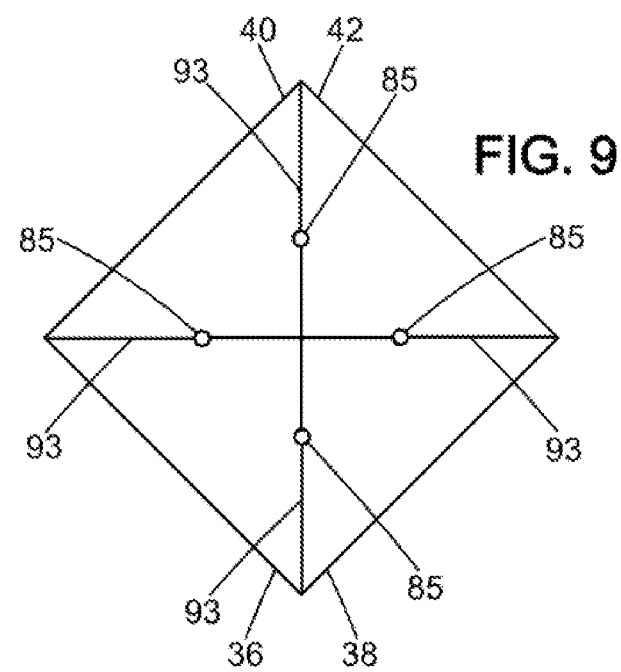
FIG. 9 is a sectional view of a second variant of the reinforcing structure of the spacecraft according to the first embodiment of the invention, the section plane being identical to the section plane of FIG. 8.

According to another variant illustrated in FIG. 9, the struts 90 extend between the corners 93 of the support structure 30 and the center 88. In this variant, the posts 85 are fixed midway between the corners 93 and the center 88. According to a less advantageous variant, the offset angle β is between 35° and 55°.

According to another variant, the offset angle β is between 25° and 65°.

Alternatively, the proximal end of the movable arms is not attached to the upper side wall but to another wall such as a base wall or a lower side wall.

Alternatively, the source housing 56 is not of the "active" type, in other words it comprises only radiating elements 62 and no electronic amplification components.

Alternatively, the source housing comprises a single radiating element.

Alternatively, the devices for transport 70 are composed of one or more thermal loops.

Figure 10:
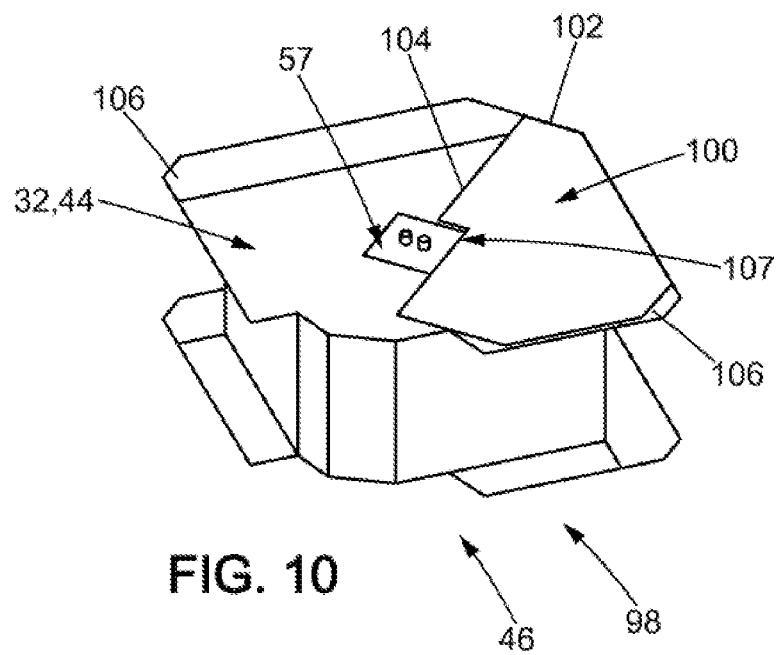
FIG. 10 is a perspective view of part of a spacecraft according to a second embodiment of the invention, in which a deployable auxiliary radiator is arranged in a folded position.

FIG. 10 represents a spacecraft 98 according to a second embodiment of the invention. The spacecraft 98 according to this second embodiment is identical to the spacecraft 28 according to the first embodiment except for the fact that it comprises one or two auxiliary radiator(s) 100 attached to main radiator 44 and one or two auxiliary radiators 100 attached to main radiator 46. The spacecraft 98 according to the second embodiment will not be described in detail. Only these differences in comparison to the spacecraft 28 according to the first embodiment will be described.

Figure 11:
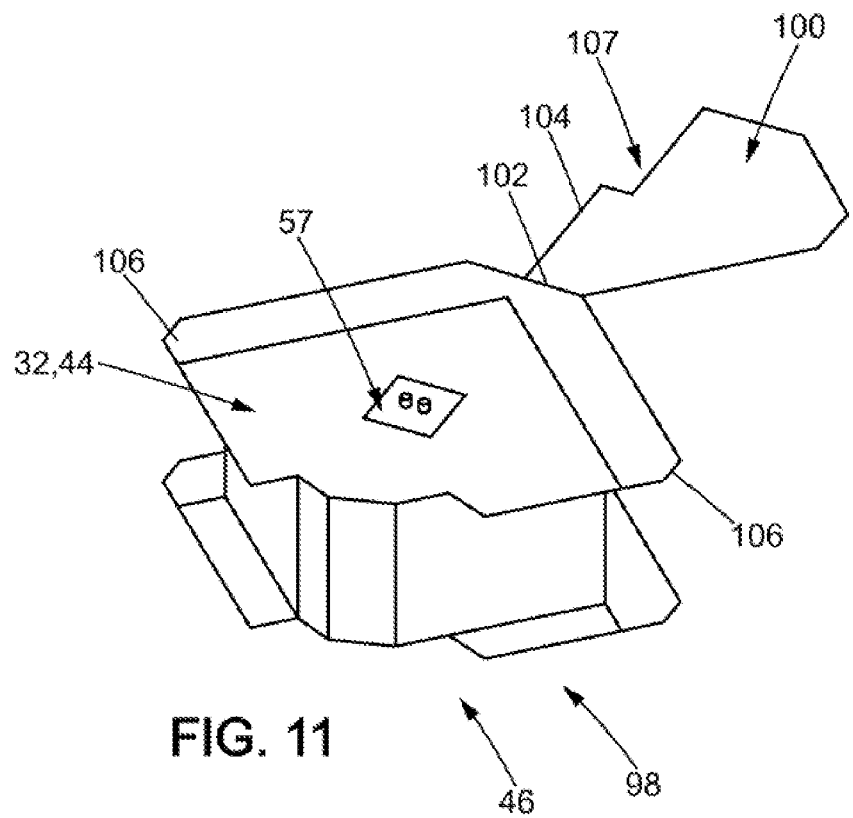
FIG. 11 is a perspective view of the spacecraft according to the second embodiment of the invention, in which a deployable auxiliary radiator is arranged in a deployed position.

In FIGS. 10 and 11, a single auxiliary radiator 100 has been represented in order to simplify the figures.

The auxiliary radiator 100 has the general shape of a triangle, the aim being to maximize the surface area considering the devices present on the wall 32. In particular, in the embodiment shown in FIGS. 10, 11, the auxiliary radiator 100 has the general shape of an isosceles triangle since the side edges 106 are of the same length This auxiliary radiator 100 may comprise at least one truncated apex defining an edge 102 pivotally fixed to the main radiator 44, so as to leave room for the shaft of a mechanism for driving a solar panel—not shown—oriented in a direction perpendicular to the main radiator 44

The auxiliary radiator 100 pivots between a folded position and an unfolded position. In the folded position, the auxiliary radiator 100 is arranged parallel to and above the main radiator 44, as shown in FIG. 10. The auxiliary radiator 100 is thus positioned at a distance from the main radiator 44 in a direction perpendicular to the main radiator 44. In the unfolded position, the auxiliary radiator 100 extends substantially as an extension of the main radiator 44, as shown in FIG. 11.

In the embodiment shown in FIGS. 10 and 11, the other two apexes of the auxiliary radiator 100 are also truncated so as not to interfere with the radiofrequency antennas.

In particular, advantageously, the auxiliary radiator 100 does not extend laterally beyond the side edge 106 of the main radiator so as not to extend into the field 66 of radiofrequency waves of the reflectors 58.

The longer side edge 104 of the auxiliary radiator 100 extends along a diagonal of the main radiator 44. This side edge 104 advantageously has a cutout 107 to accommodate the thrusters 57 arranged on the base wall 32. Other cutouts—not shown may be present to accommodate other devices mounted on the wall 34, such as attitude control sensors.

Advantageously, these auxiliary heaters 100 may be deployed when the solar generator—not shown—is deployed and rotates according to the orientation of the sun.

Figure 12:
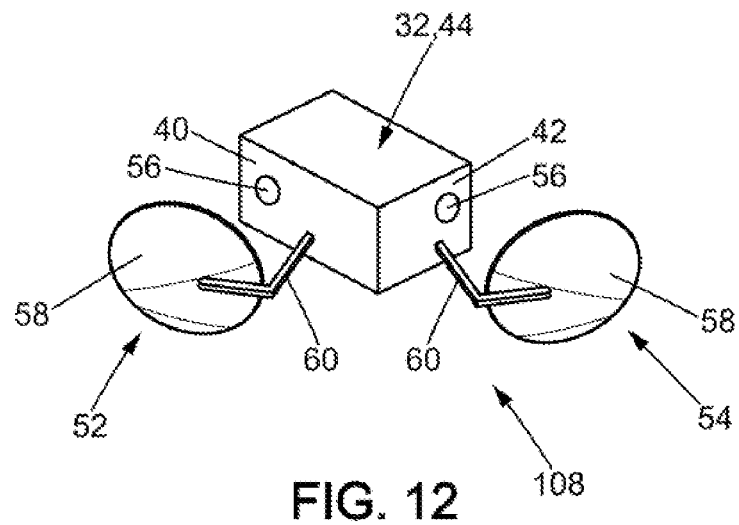
FIG. 12 is a perspective view of a spacecraft according to a third embodiment of the invention.
Figure 13:
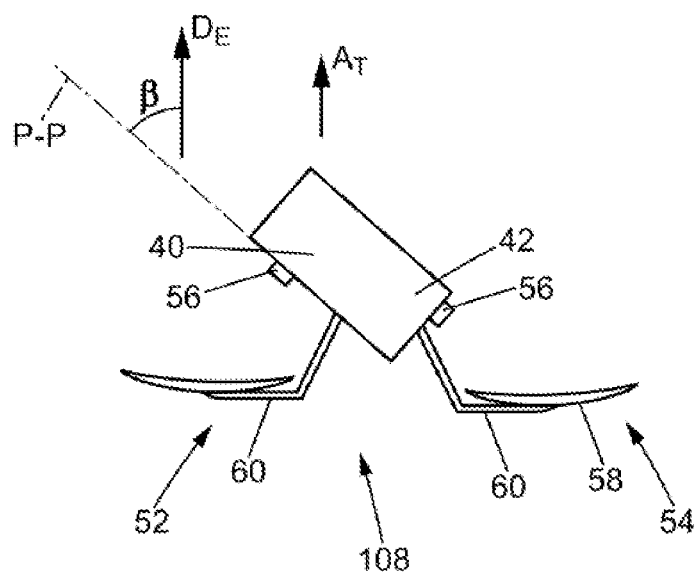
FIG. 13 is a sectional view of the spacecraft according to the third embodiment of the invention, the section plane being parallel to the base wall.

FIGS. 12 and 13 show a spacecraft 108 according to a third embodiment of the invention. The spacecraft 108 according to this third embodiment is identical to the spacecraft 28 according to the first embodiment except that the support structure 30 has a rectangular cross-section in a section plane parallel to the base walls 32, 34.

Figure 14:
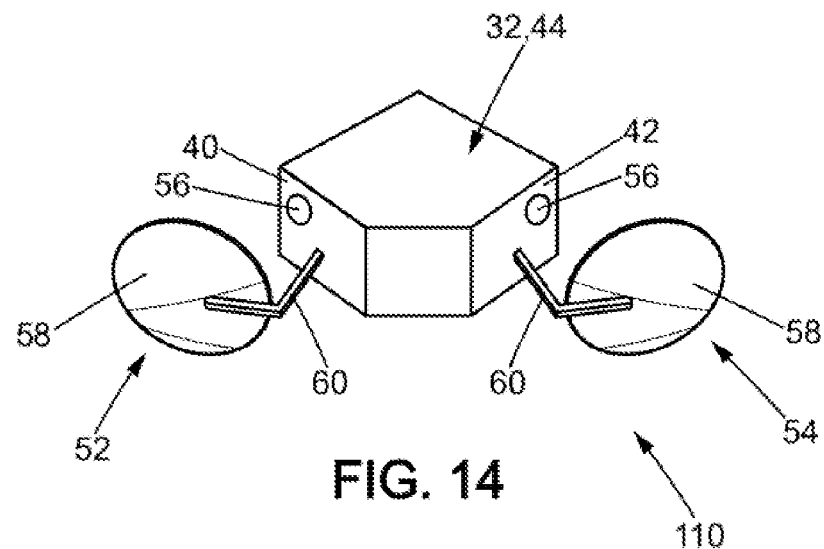
FIG. 14 is a perspective view of a spacecraft according to a fourth embodiment of the invention.
Figure 15:
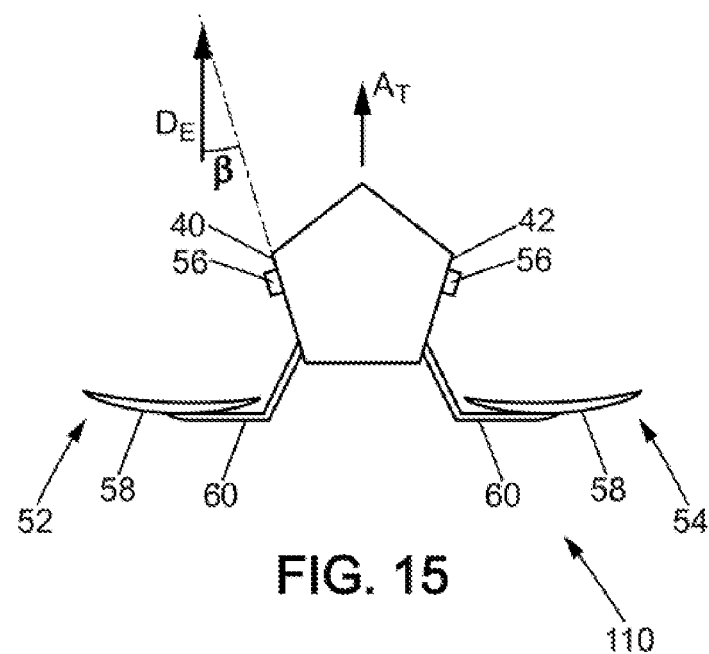
FIG. 15 is a sectional view of the spacecraft according to the fourth embodiment of the invention, the section plane being parallel to the base wall.

FIGS. 14 and 15 show a spacecraft 110 according to a fourth embodiment of the invention. The spacecraft 110 according to this fourth embodiment is identical to the spacecraft 28 according to the first embodiment except that the support structure 30 has a pentagonal cross-section in a section plane parallel to the base walls 32, 34.

Figure 16:
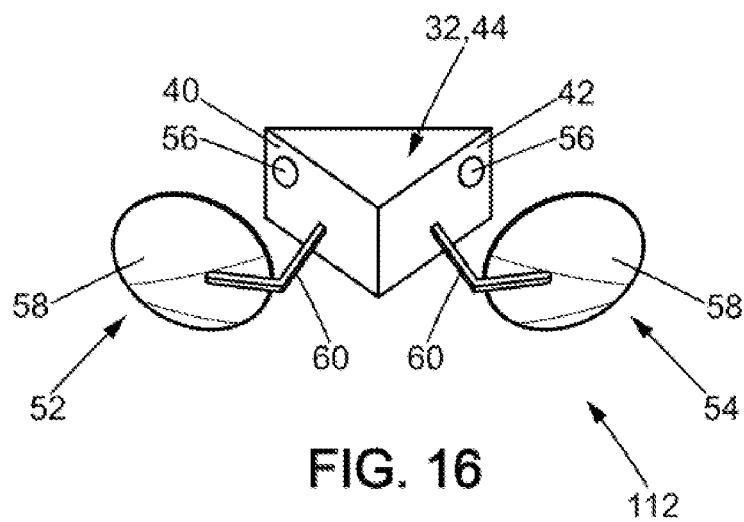
FIG. 16 is a perspective view of a spacecraft according to a fifth embodiment of the invention.
Figure 17:
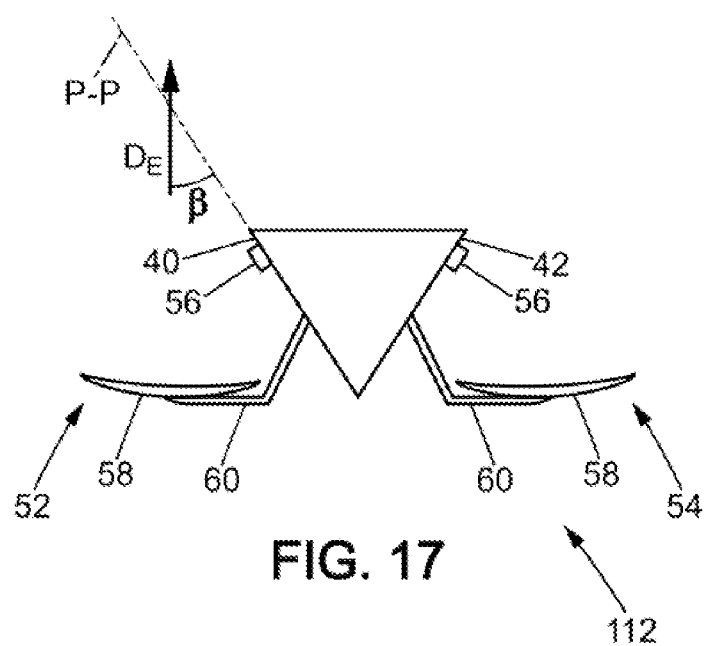
FIG. 17 is a sectional view of the spacecraft according to the fifth embodiment of the invention, the section plane being parallel to the base wall.

FIGS. 16 and 17 show a spacecraft 112 according to a fifth embodiment of the invention. The spacecraft 112 according to this fifth embodiment is identical to the spacecraft 28 according to the first embodiment except that the support structure 30 has a triangular cross-section in a section plane parallel to the base walls 32, 34.

Figure 18:
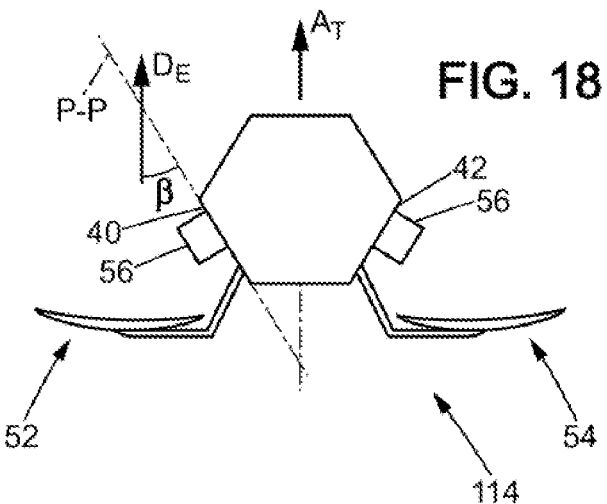
FIGS. 18 to 20 are sectional views of a spacecraft according to sixth, seventh, and eighth embodiments of the invention respectively, the section plane being parallel to the base wall.

FIG. 18 shows a spacecraft 114 according to a sixth embodiment of the invention. The spacecraft 114 according to this sixth embodiment is identical to the spacecraft 28 according to the first embodiment except that the support structure 30 has a hexagonal cross-section in a section plane parallel to the base walls 32, 34.

Figure 19:
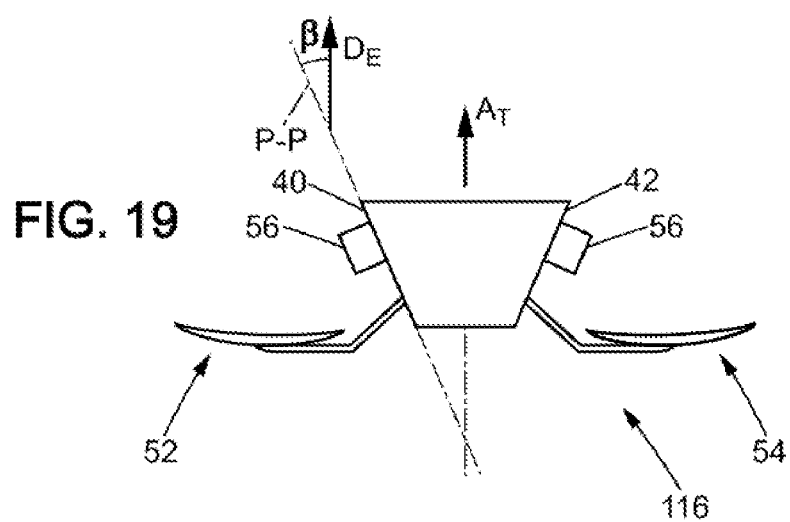

FIG. 19 shows a spacecraft 116 according to a seventh embodiment of the invention. The spacecraft 116 according to this seventh embodiment is identical to the spacecraft 28 according to the first embodiment except that the support structure 30 has a trapezoidal cross-section in a section plane parallel to the base walls 32, 34.

Figure 20:
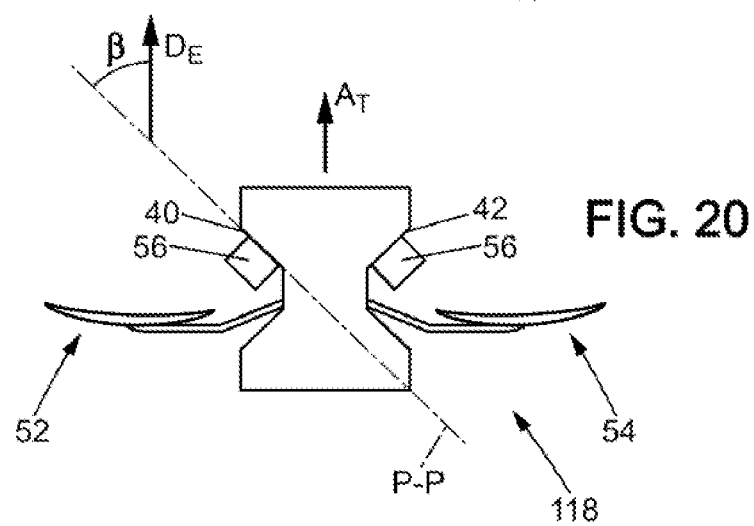

FIG. 20 shows a spacecraft 118 according to an eighth embodiment of the invention. The spacecraft 118 according to this eighth embodiment is identical to the spacecraft 28 according to the first embodiment except that the support structure 30 has a cross-section forming any polygon in a section plane parallel to the base walls 32, 34. This polygon comprises two side walls 40, 42 forming planes defining an offset angle β equal to 45° with the direction of emission of the reflectors 58, when the movable arm 61 is in a deployed position. As in the first embodiment of the spacecraft 28 according to the invention, the direction of emission $D_E$ is parallel to the angle of sight $A_T$, when the spacecraft 118 is in orbit and the mobile arm 61 is in a deployed position.

Figure 21:
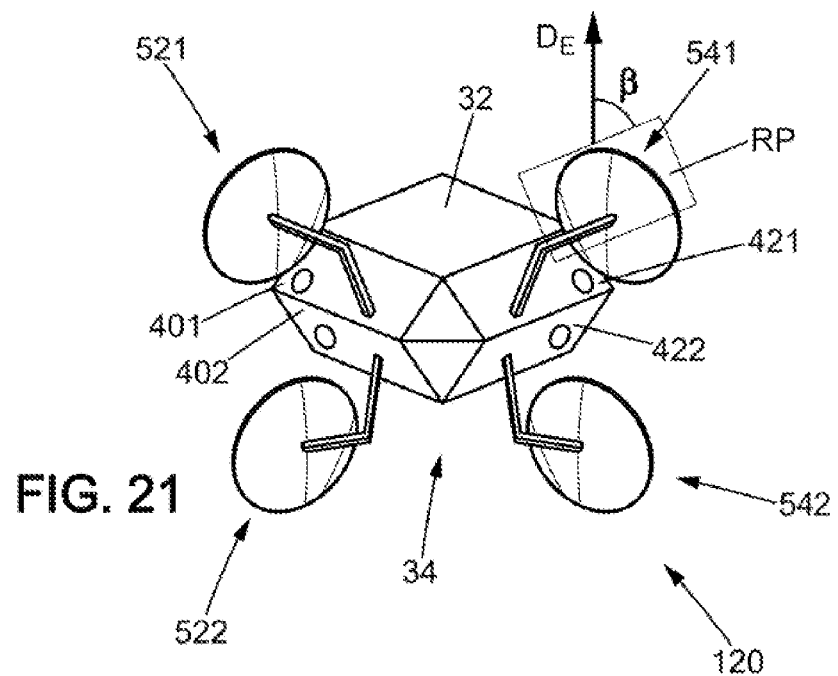
FIG. 21 is a perspective view of a spacecraft according to a ninth embodiment of the invention.

FIG. 21 shows a spacecraft 120 according to a ninth embodiment of the invention. The spacecraft 120 according to the ninth embodiment is identical to the spacecraft 28 according to the first embodiment except that each upper side wall 40, 42 comprises two wall sections 401, 402, 421, 422 attached to one another and forming a V-shaped angle. Each wall section 401, 402, 421, 422 carries a main communication antenna identical to the communication antennas of the spacecraft according to the first embodiment of the invention.

Each wall section 401, 402, 421, 422 extends in a plane P-P which forms, with the direction of emission $D_E$, an offset angle β equal to 45°. When the spacecraft 120 is in orbit and the movable arms are deployed, the axis of sight towards the Earth $A_T$ is parallel to the emission axis $D_E$.

Figure 22:
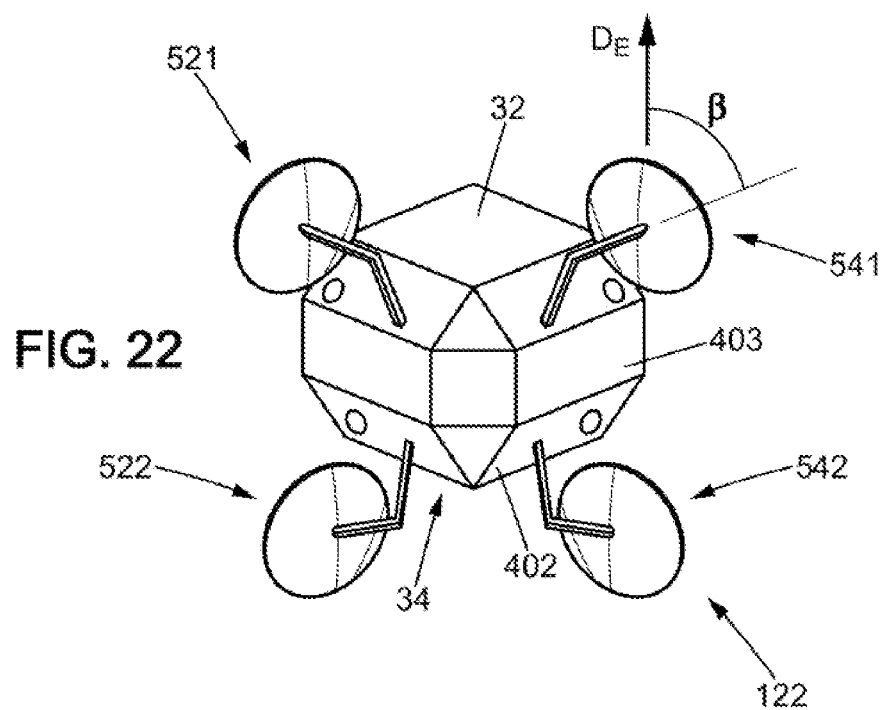
FIG. 22 is a perspective view of a spacecraft according to a tenth embodiment of the invention.

FIG. 22 shows a spacecraft 122 according to a tenth embodiment of the invention. The spacecraft 122 according to the tenth embodiment is identical to the spacecraft 28 according to the first embodiment except that each upper side wall 40, 42 comprises three wall sections 401, 402, 403; 421, 422, 423 attached to one another and forming a U-shaped angle. The side wall sections 401, 402; 421, 422 each carry a main communication antenna identical to the communication antennas of the spacecraft according to the first embodiment of the invention.

The side wall sections 401, 402, 421, 422 extend in a plane P-P which forms, with the direction of emission $D_E$, an offset angle β equal to 45°. When the spacecraft 122 is in orbit and the movable arms 61 are deployed, the direction of emission $D_E$ is parallel to the axis of sight towards the Earth $A_T$.

The invention claimed is:

1. A spacecraft, comprising:
   a support structure having two base walls arranged parallel to and at a distance from one another and at least three flat side walls fixed to the base walls,
   at least one main communication antenna comprising:
      at least one radiating element carried by at least one flat side wall, said at least one radiating element having a central axis of radiation (AC-AC), said at least one radiating element is configured to emit or receive radiofrequency waves,
      a movable arm able to move between a deployed position and a folded position,
      a reflector carried by the movable arm, said reflector is configured for reflecting or receiving radiofrequency waves in a direction of emission (DE),
   when the movable arm is in the deployed position,
   wherein said at least one radiating element is fastened to the at least one side wall so that the central axis of radiation (AC-AC) of the radiating element is perpendicular to said at least one side wall carrying said at least one radiating element, and in that the movable arm is shaped so that an offset angle ($\beta$) of between 25° and 65° is formed between said at least one side wall carrying said at least one radiating element and the direction of emission (DE), when the movable arm is in the deployed position.

2. The spacecraft according to claim 1, wherein the offset angle ($\beta$) is between 35° and 55°.

3. The spacecraft to claim 2, wherein the offset angle ($\beta$) is equal to 45°.

4. The spacecraft according to claim 1, wherein two adjacent flat side walls directly attached to each other each carry at least one radiating element having a central axis of radiation (AC-AC) perpendicular to the side wall which carries them.

5. The spacecraft according to claim 1, wherein the support structure comprises four flat side walls fixed perpendicularly to each other so as to present a square cross-section in a section plane which extends parallel to the base wall, and wherein a diagonal (D) connecting two opposite corners of said square cross-section extends along the direction of emission (DE) of the reflector, when the movable arm is in a deployed position.

6. The spacecraft according to claim 1, further comprising at least one main radiator carried by the base wall and a heat transfer device comprising at least one L-shaped device for transporting heat by fluid, said device for transporting heat having a first rectilinear portion in direct thermal contact with the base wall carrying the main radiator, a single bent portion, and a second rectilinear portion in direct thermal contact with said at least one radiating element and the flat side wall carrying said at least one radiating element.

7. The spacecraft according to claim 6, wherein said flat side wall carrying said at least one radiating element comprises at least one lateral cutout, and wherein said bent portion of the device for transporting heat is engaged in said lateral cutout, the second rectilinear portion extending over an outer face of said flat side wall carrying said at least one radiating element.

8. The spacecraft according to claim 1, comprising at least one electronic amplification component suitable for amplifying electrical signals transmitted to said at least one radiating element, and a housing comprising said at least one radiating element and said at least one electronic amplification component.

9. The spacecraft according to claim 1, further comprising at least one main radiator carried by the base wall and at least one auxiliary radiator mounted to pivot between a folded position in which the auxiliary radiator is arranged parallel to and adjacent to the main radiator, and an unfolded position in which the auxiliary radiator extends substantially as an extension of the main radiator.

10. The spacecraft according to claim 9, wherein said at least one auxiliary radiator has the shape of a triangle.

11. The spacecraft according to claim 10, wherein one of the vertices of the triangle is truncated and defines an edge mounted to pivot relative to the main radiator.

12. The spacecraft according to claim 1, further comprising at least one main radiator carried by a base wall, and wherein said at least one main radiator comprises at least three corners and wherein at least one corner of the main radiator is truncated along a section plane parallel to the direction of emission (DE).

13. The spacecraft to claim 1, wherein the support structure comprises:
   four posts extending in a direction perpendicular to the base walls, said posts are distributed at the vertices of a parallelogram, and
   a reinforcing structure rigidly connecting the four posts to a same center.

14. The spacecraft to claim 1, wherein the support structure has a polygonal cross-section in a section plane parallel to a plane of the base wall carrying a main radiator, said polygonal cross-section is chosen from the following group: a triangular cross-section, a rectangular cross-section, a square cross-section, a trapezoidal cross-section, a pentagonal cross-section, a hexagonal cross section.

15. A launcher, comprising a fairing and at least one spacecraft according to claim 1 under the fairing and comprising at least one main radiator carried by a base wall, said main radiator is arranged perpendicularly to the direction of launch (AL).

16. A stack of multiple spacecraft according to claim 13, comprising at least two spacecraft arranged one on top of another, each post of a first spacecraft is carried by a post of the second spacecraft, the posts of each spacecraft extending in the same direction.

17. The spacecraft of claim 1, wherein said reflector is configured for directly reflecting or receiving radiofrequency waves in a direction of emission (DE).

* * * * *